United States Patent [19]

Wu

[11] Patent Number: 4,689,527
[45] Date of Patent: Aug. 25, 1987

[54] DOUBLE DRIVING DEVICE FOR MACHINES

[76] Inventor: Yao-Yu Wu, No. 181 sec 4, Chin-Hwa Road, Tainan, Taiwan

[21] Appl. No.: 749,180

[22] Filed: Jun. 26, 1985

[51] Int. Cl.$^4$ ............................................. H02P 7/74
[52] U.S. Cl. ...................................... 318/45; 318/46; 318/5
[58] Field of Search ....................... 318/45, 46, 47, 48, 318/5, 332, 333, 401, 432, 433, 486, 39, 98, 99; 74/832, 661, 847; 83/223, 224, 283, 298, 313, 324, 355, 494, 548, 571, 572, 593, 617

[56] References Cited

U.S. PATENT DOCUMENTS

| | | | |
|---|---|---|---|
| 1,954,132 | 4/1934 | Iversen | 83/298 X |
| 2,531,044 | 11/1950 | Hibbert et al. | 318/46 |
| 2,652,919 | 9/1953 | Jochem | 318/45 X |
| 2,780,114 | 2/1957 | Breuer et al. | 74/661 |
| 2,958,302 | 11/1960 | Frankel et al. | 318/46 X |
| 2,996,876 | 8/1961 | Beneditz | 318/432 X |
| 3,798,519 | 3/1974 | Habisohn | 318/45 X |
| 3,952,235 | 4/1976 | Peters | 318/48 |
| 3,959,699 | 5/1976 | Brail | 318/45 |

Primary Examiner—William M. Shoop, Jr.
Assistant Examiner—Bentsu Ro

[57] ABSTRACT

This invention provides a double driving device which includes two motors, sharing a same common shaft or having their shafts linked together, and a control circuit. The two motors have different horse power and are used in machines, such as presses or shearing machines, which always use only one motor with less power to operate while the machines is not loaded but both of the motors while the machine is loaded so as to save the energy consumed unnecessarily during periods of no practical work. The control circuit is used to supply the intermittent operation of the motor with greater horse power.

3 Claims, 3 Drawing Figures

DOUBLE DRIVING DEVICE FOR MACHINES

BACKGROUND OF THE INVENTION

Existing machines such as presses or shearing machines are usually equipped with only one motor for driving. Therefore, even when the machine is working without any load, it must be still maintained with the motor rotating. Since the motor must possess a somewhat large horse power, it consumes a large amount of electricity even when there is no load driven by the machine, and consequently it results in waste of energy.

SUMMARY OF THE INVENTION

This invention provides a double driving device for machines comprising two motors each having a different or the same horse power. The motors may share a common shaft or have their shafts linked together. A control circuit is also provided. The device uses only the motor with less horse power to operate when the machine is not loaded but both of the motors when the machine is loaded in order to save the energy consumed unnecessarily during the time when no practical work is done by the machine.

The invention employs two motors with different horse power, possessing a common shaft for rotation. The two motors can work separately or together depending on whether the machine is loaded or not.

Normally, the smaller motor runs when the machine is not doing actual work, while the bigger motor will drive the machine with or without the smaller motor only when a load is driven. Therefore, during periods of no work, a great deal of electricity used in moving the bigger motor can be saved.

DETAILED DESCRIPTION OF PREFERRED EMBODIMENTS OF THE INVENTION

Figure 1:
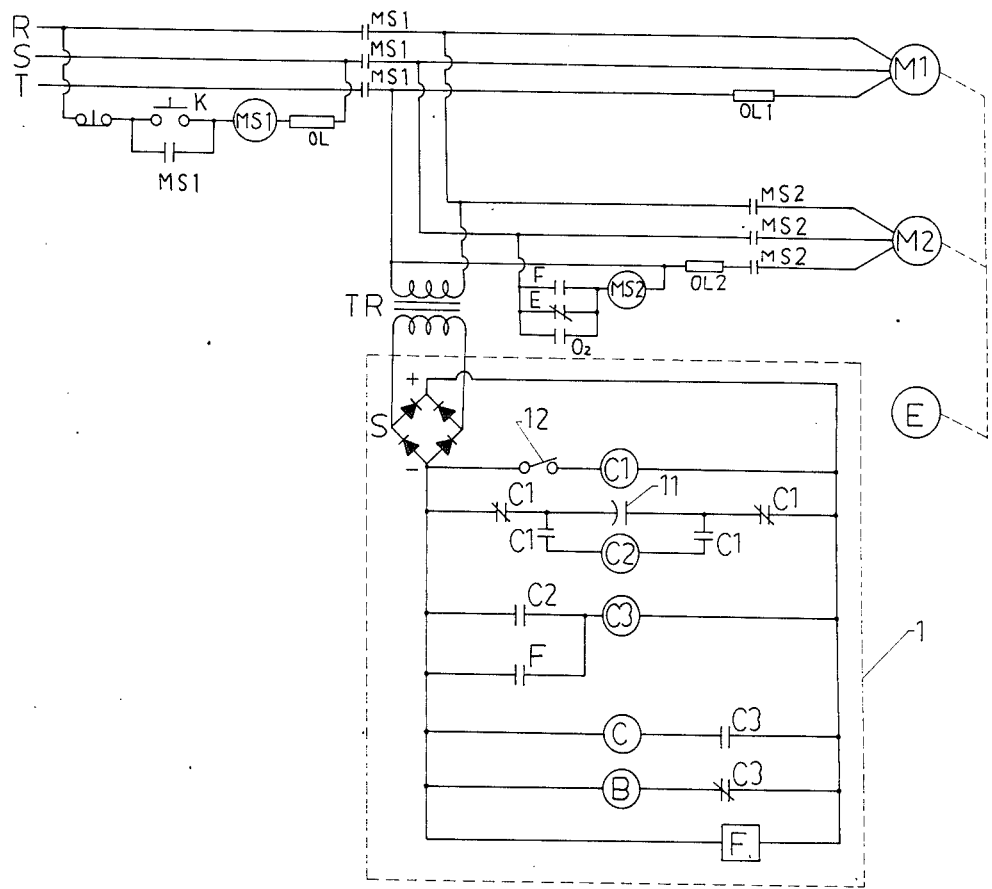
FIG. 1 is a diagram of an electric circuit used in this invention.

With reference to FIG. 1 of the drawings, there is shown a device which includes motors M1 and M2, possessing a common shaft for rotation or having their shafts linked together. A control circuit 1 is provided which serves to start or stop the motor M2, which therefore rotates intermittently. The motor M1 keeps the machine working when the machine is free of load, and the motors M1 and M2 work at the same time once a load is put in the machine for processing.

As shown in FIG. 1, as switch K is pressed, magnetic switches MS1 and MS2 are commanded simultaneously to initiate rotation of motors M1 and M2. As soon as the speed of the motors reaches a predetermined number of revolutions per second (RPM), as set by indicator E, the normal close point E1 of the indicator E is to be opened, turning off the magnetic switch MS3, stopping rotation of the motor M2 and leaving the motor M1 working alone when there is no load in the machine.

After the motor M1 is started, activated by transformer TR and full-wave rectifier S, the control circuit 1 and capacitor 11 are in a charged condition. In this situation, when, switch 12 is turned on, relay C1 immediately starts to operate and the two normal close points on the two sides of the capacitor 11 will immediately cut off the charging circuit of the capacitor 11, and the two normal open points on the two sides of relay C2 will close to enable said capacitor 11 to discharge, forcing the relay C2 to operate.

The operating time period of the relay C2, which need not be long, depends on the capacitor 11. As soon as the relay C2 starts to operate, relay C3 successivelly follows up to work, releasing brake B and driving back clutch C as well. The magnetic switch MS2 is closed to start up the motor M2, which indicates that the machine is going into the loaded state.

Before the clutch C is driven up and the flywheel shaft rotates, the two points of an inductance switch F set beside said flywheel shaft are always open. When the flywheel shaft starts to rotate, its point opposite to the inductance switch F is turned away from the inductance switch F and the two normal open points are closed to replace the two normal open points of the relay C2 so as to keep a machine, such as a press, working continuously. As the flywheel turns one round, which means to perform the operation once, the opposite point on the flywheel shaft is turned back to face against the inductance switch F and the two points of the inductance switch F become normal open right away, cutting off the motor M2 and the relay C3 and the machine returns to the condition without burden.

Figure 2:
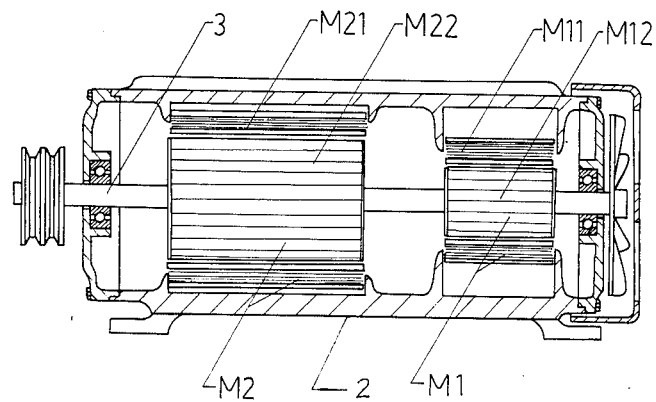
FIG. 2 is a cross-sectional view of two motors sharing a same common shaft used in this invention.

The embodiment wherein motors M1 and M2 have a same common shaft and common case is illustrated in FIG. 2. Stator M11 of the motor M1 and stator M21 of the motor M2 are enveloped in common case 2. Rotator M12 of the motor M1 and rotator M22 of the motor M2 are fixed on the same common shaft 3.

Figure 3:
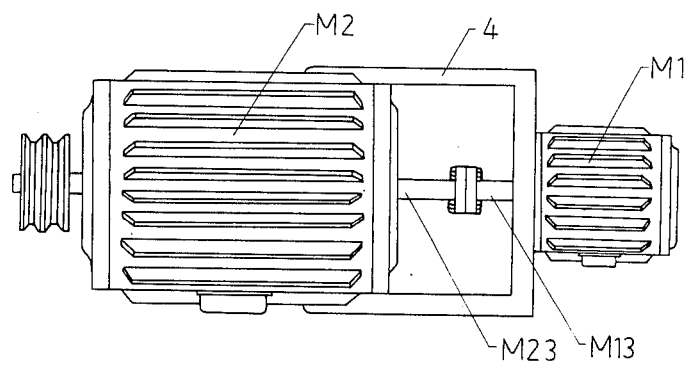
FIG. 3 is a side view of two motors with shafts linked together.

In another embodiment, the motors M1 and M2 have their shafts linked together as illustrated in FIG. 3. The motor M1 is fixed on a frame 4 on one side of the motor M2 enabling the motors M1 and M2 to be lined on the same axis. Shaft M23 of the motor M2 is linked with shaft M13 of the motor M1.

A comparison of energy consumption in practical use between the invention and a conventional driving device in a power press is shown as follows.

For example, a press with the capacity of 100 tons requires a driving force of 10 HP; that is, a 10 HP motor is needed to drive the press. The conventional device always uses a 10 HP motor, but in the present invention, two different motors making up 10 HP together are used. The current consumption is compared as follows: (the motor used is three phases, 60 cycles, 220 V, 6 poles, E class.)

|  | 1. Real consumption of current without load (A) | 2. Real consumption of current with load (A) |
| --- | --- | --- |
| A. The convention | 19.5 (18 A for idle rotation, 1.5 A for non-loaded press) | 29 A |
| B. This invention | 3.9A (M1) | 29.3A (M1 + M2) |

This comparison is based on the operation of shearing a chain plate 9.5 mm, thick, 175 diameter.

If the machine works 8 hours a day and a working cycle is 7 seconds, 5 seconds for operation without load and 2 seconds with load, the energy to be saved in 8 hours by this invention is 19.46 KW/H.

$$(19.5 - 3.9) \times 220 \times 8\frac{5}{7} - (29.3 - 29) \times$$
$$220 \times 8 \times \frac{2}{7} = 19460 \text{ watts/hour}$$

The invention is not limited to the precise constructional details described or illustrated above.

What is claimed is:

1. A double driving device for a machine, the device comprising: first and second motors, each motor being adapted to rotate a common shaft member; and a control circuit for operating the first and second motors individually or in combination depending upon whether the machine is in a loaded or unloaded condition, the first motor being operational when the machine is in an unloaded condition, the first and second motors being operational when the machine is in the loaded condition only.

2. A device as claimed in claim 1 wherein the second motor has a power output which is greater than that of the first motor.

3. A device as claimed in claim 1 wherein the first and second motors have substantially equal power outputs.

* * * * *